(12) United States Patent
Morales (10) Patent No.: US 11,477,347 B2
(45) Date of Patent: Oct. 18, 2022

(54) METHODS AND SYSTEM INCLUDES MEASURING A CALIBRATION CHART USING INK LIMITS TO GENERATE TONE REPRODUCTION CURVE (TRC) FOR ADJUSTING ORIGINAL COLOR PROFILE

(71) Applicant: Kyocera Document Solutions, Inc., Osaka (JP)

(72) Inventor: Javier A. Morales, Rochester, NY (US)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 17/200,266

(22) Filed: Mar. 12, 2021

(65) Prior Publication Data
US 2022/0294932 A1    Sep. 15, 2022

(51) Int. Cl.
| | | |
|---|---|---|
| *H04N 1/60* | (2006.01) | |
| *B41J 29/393* | (2006.01) | |
| *B41J 2/21* | (2006.01) | |
| *G03G 15/00* | (2006.01) | |
| *H04N 1/32* | (2006.01) | |

(52) U.S. Cl.
CPC .......... *H04N 1/6033* (2013.01); *B41J 2/2132* (2013.01); *B41J 29/393* (2013.01); *B41J 2029/3935* (2013.01); *G03G 15/5025* (2013.01); *G03G 15/5058* (2013.01); *H04N 1/32309* (2013.01)

(58) Field of Classification Search
CPC ............... H04N 1/4078; H04N 1/6033; H04N 1/00045; H04N 1/00761

USPC ................. 358/1.9, 504, 518, 3.23
See application file for complete search history.

(56) References Cited

U.S. PATENT DOCUMENTS

| | | | |
|---|---|---|---|
| 7,417,769 B2* | 8/2008 | Hasler | H04N 1/603 358/518 |
| 8,068,256 B2 | 11/2011 | Dalal | |
| 9,809,035 B2 | 11/2017 | Ochs | |
| 2004/0165199 A1* | 8/2004 | Klassen | H04N 1/6033 358/1.9 |
| 2005/0099446 A1* | 5/2005 | Mizes | B41J 29/393 347/19 |
| 2008/0007802 A1* | 1/2008 | Viturro | H04N 1/46 358/504 |
| 2008/0247770 A1* | 10/2008 | Morales | G03G 15/5062 399/72 |
| 2011/0304863 A1* | 12/2011 | Shibuya | H04N 1/6097 358/1.9 |

(Continued)

*Primary Examiner* — Haris Sabah
(74) *Attorney, Agent, or Firm* — Millen, White, Zelano & Branigan, P.C.; William F. Nixon (57) ABSTRACT

A color printing system includes a color management service and one or more printing devices. An ink limit is specified for a calibration operation that uses a calibration chart to obtain measurement data. Using the measurement data, a calibration tone reproduction curve (TRC) along with calibration settings is generated. The calibration TRC and the ink limit are stored. For a print job, the calibration is identified and used to retrieve the calibration TRC and the ink limit. The original ICC profile for the calibration TRC also is provided. The ink limit is used to adjust the ICC profile accordingly. The adjusted ICC profile is used for color printing one or more documents for a print job.

17 Claims, 7 Drawing Sheets

(56) References Cited

U.S. PATENT DOCUMENTS

| | | | |
|---|---|---|---|
| 2012/0086983 A1* | 4/2012 | Taylor | H04N 1/4078 358/3.01 |
| 2012/0206745 A1* | 8/2012 | Shibuya | H04N 1/6033 358/1.9 |
| 2018/0063381 A1* | 3/2018 | Takesue | G01J 3/524 |

* cited by examiner

METHODS AND SYSTEM INCLUDES MEASURING A CALIBRATION CHART USING INK LIMITS TO GENERATE TONE REPRODUCTION CURVE (TRC) FOR ADJUSTING ORIGINAL COLOR PROFILE

FIELD OF THE INVENTION

The present invention relates to defining ink limits as part of the calibration process within a color printing environment.

DESCRIPTION OF THE RELATED ART

Color management is one of the more complex aspects of color printing. Two operations may be performed for production print color management, calibration and ICC profile creation. In color management, an ICC profile is a set of data that characterizes a color input or output device, or a color space, according to standards promulgated by the International Color Consortium (ICC). Calibration provides a stable foundation on which ICC profiling can be implemented. Calibration may be relatively straight-forward as opposed to ICC profile creation. Calibration linearizes color printing device response so that individual color ramps, or colors in 10% increments from 10%-100%) are evident. ICC profile creation provides more advanced functionality such as ink limiting, or putting a limit on the maximum amount of ink used to create colors.

Printing device calibration may require scanning 80 or so calibration patches. Patches are in rows that are scanned in an operation. A calibration target may use 4 rows of patches. ICC profile creation requires scanning several thousand patches that also are organized in rows. For this reason, ICC profile creation is more time consuming and prone to errors as opposed to calibration. For print shops that do not have stringent color requirements, calibration provides most of the color management functionality that is needed. Print shops, however, need to create ICC profiles because ink limiting is a critical color management operation.

SUMMARY OF THE INVENTION

A method for performing color management of a printing device is disclosed. The method includes measuring a calibration chart for the printing device to obtain measurement data. The method also includes generating a calibration tone reproduction curve (TRC) using calibration settings corresponding to the measurement data. The method also includes specifying an ink limit for the calibration TRC. The method also includes determining an original ICC profile associated with the calibration TRC. The method also includes adjusting the original ICC profile in accordance with the ink limit to produce an adjusted ICC profile.

A method for managing color printing of a print job is disclosed. The method includes storing a calibration tone reproduction curve (TRC) and an ink limit. The method also includes identifying a calibration associated with the print job. The method also includes retrieving the calibration TRC and the ink limit for the print job based on the calibration. The method also includes determining an ICC profile for the print job. The ICC profile is associated with the calibration TRC. The method also includes adjusting the ICC profile according to the ink limit. The method also includes performing color conversion using the adjusted ICC profile. The method also includes printing the print job with the color conversion.

A method for color printing a print job at a printing device is disclosed. The method includes receiving the print job at the printing device. The print job includes an ink limit. The method also includes determining an original ICC profile for the print job. The method also includes adjusting the original ICC profile in accordance with the ink limit to produce an adjusted ICC profile. The method also includes performing color conversion for the print job using the adjusted ICC profile. The method also includes printing the print job at the printing device.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments may utilize the following definitions:

Printer calibration—a process for ensuring consistent color quality generated by printing devices.

Test color patch—an area, which may be rectangular, containing a single color on a test color sheet.

Test color strip—a series or row of test color patches on a printed test color sheet.

Control strip—a test color strip that also contains encoded information.

Target print job—a printed page, containing rows of test color strips, used for printing device calibration.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that is used as a device-independent reference.

The disclosed embodiments define a method in which ink limits may be defined and used without ICC profile creation. This feature eliminates the requirement for ICC profile creation for many commercial printing devices. The disclosed embodiments provide an extension to calibration that will allow print shops to define ink limits as part of the calibration process, thereby enabling definition and use of ink limits without the creation of ICC profiles.

Figure 1A:
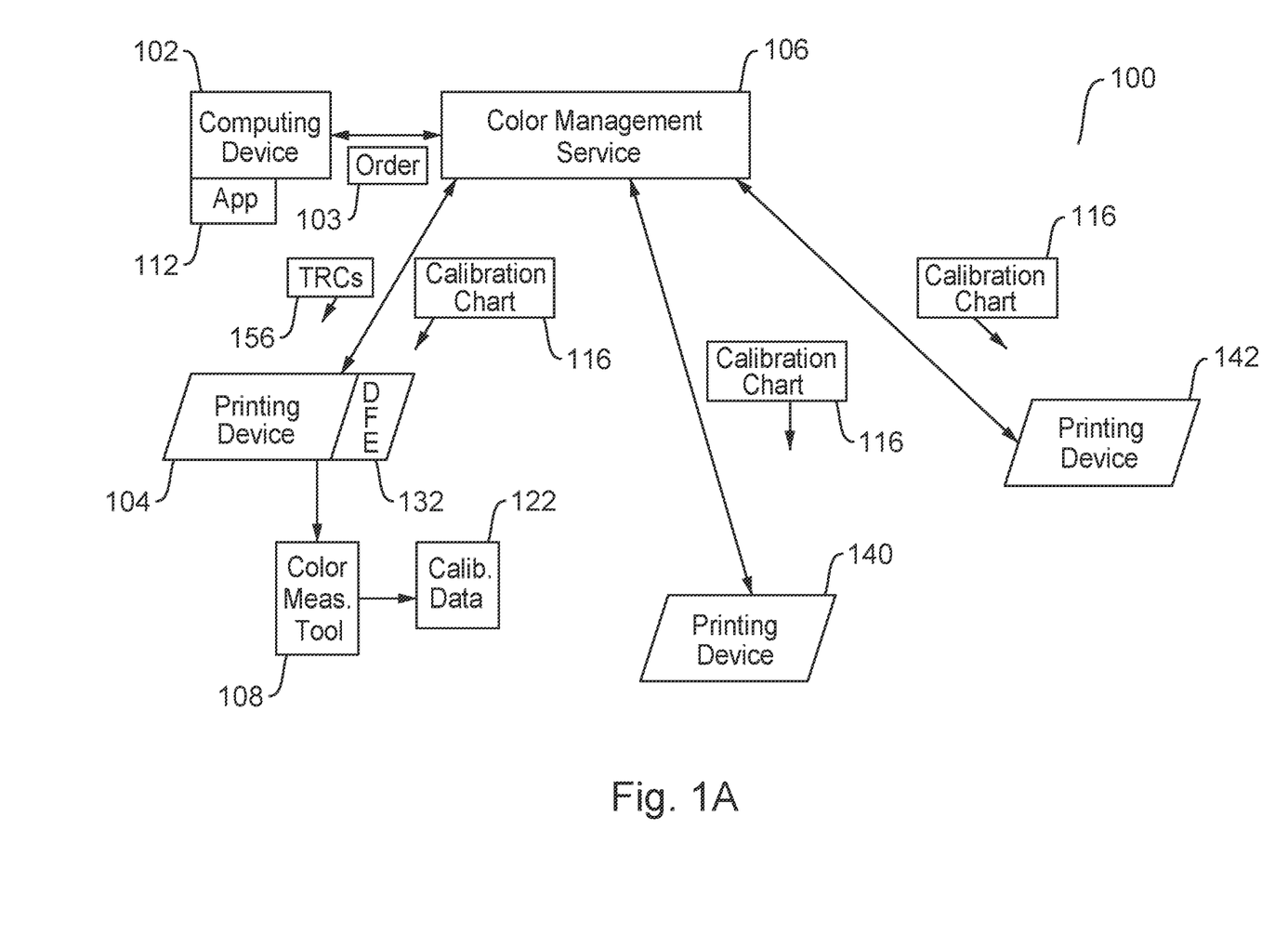
FIG. 1A illustrates a block diagram of a color management system for printing devices according to the disclosed embodiments.

FIG. 1A depicts a color management system 100 for printing devices 104, 140, and 142 according to the disclosed embodiments. Color management system 100 includes a centralized color management service 106. Color management service 106 may be a server that registers all printing devices within system 100 and controls color management operations for the printing devices. In some embodiments, color management system 100 may be a system or network within a print shop having several or more printing devices.

Printing devices 104, 140, and 142 may receive print jobs from color management service 100. They also may receive calibration print jobs and quality checks from color management service 100. Calibration print jobs may be shown as calibration charts 116, disclosed in greater detail below. Other items and data files may be sent to printing devices 104, 140, and 142. Further, the printing devices may provide data and information to color management service 100 so that it may manage color printing operations within system 100.

In some embodiments, computing device 102 may include an application 112 that generates data for printing that is sent to color management service 106. Color management service 106 also may exchange data with printing device 104 for performing calibration operations, specifically color calibration. Color management service 106 is a server that manages print jobs and tasks between a plurality of printing devices 104, 140, and 142. Color management service 106 also provides calibration operations to the printing devices. A user may perform calibration tasks for the plurality of printing devices using color management service 106 from computing device 102.

Preferably, color management service 106 allows for inspection, calibration, and profiling of color print jobs. Color management service 106 may act as a software as a service (SaaS) solution that provides color management. The service enables repeatable color reproduction at the printing devices. Color management service 106 also may manage digital front ends (DFEs) from production printing which include paper catalogs. These paper catalogs may include paper measurements and paper color measurement profiles. For example, printing device 104 includes DFE 132.

In some embodiments, a user may request calibration for printing device 104 within system 100. The user may utilize application 112 on computing device 102 to generate order 103 to generate calibration data for printing device 104. Order 103 may include a request type, a printing device identification, and a media/paper identification. In order to ensure the best possible color reproduction, production printing devices may associate the retained color management profiles with specific paper media. Most printing devices may use hundreds of different paper types, with each paper resulting in printing and measuring color patches. Thus, the user may generate and send a large number of requests for calibrations of these different types of papers at once.

Color management service 106 receives order 103 for calibration of printing device 104 based on the provided information. Color management service 106 generates a calibration chart 116 to obtain calibration data for the paper at printing device 104. Calibration chart 116 includes color patches used to perform calibration operations. Calibration chart 116 is forwarded to printing device 104, which prints it out on the indicated paper/media type. An operator takes calibration chart 116. The operator may use color measurement tool 108 to measure the color patches on calibration chart 116 to obtain calibration data 122.

In some embodiments, the operator may measure the color patches on calibration chart 116 by moving color measurement tool 108 over the appropriate parts of the sheet. The movement may be done by hand. In other embodiments, printing device 104 may perform these measurements using an inline measurement tool as opposed to a near-line measurement tool.

Figure 1B:
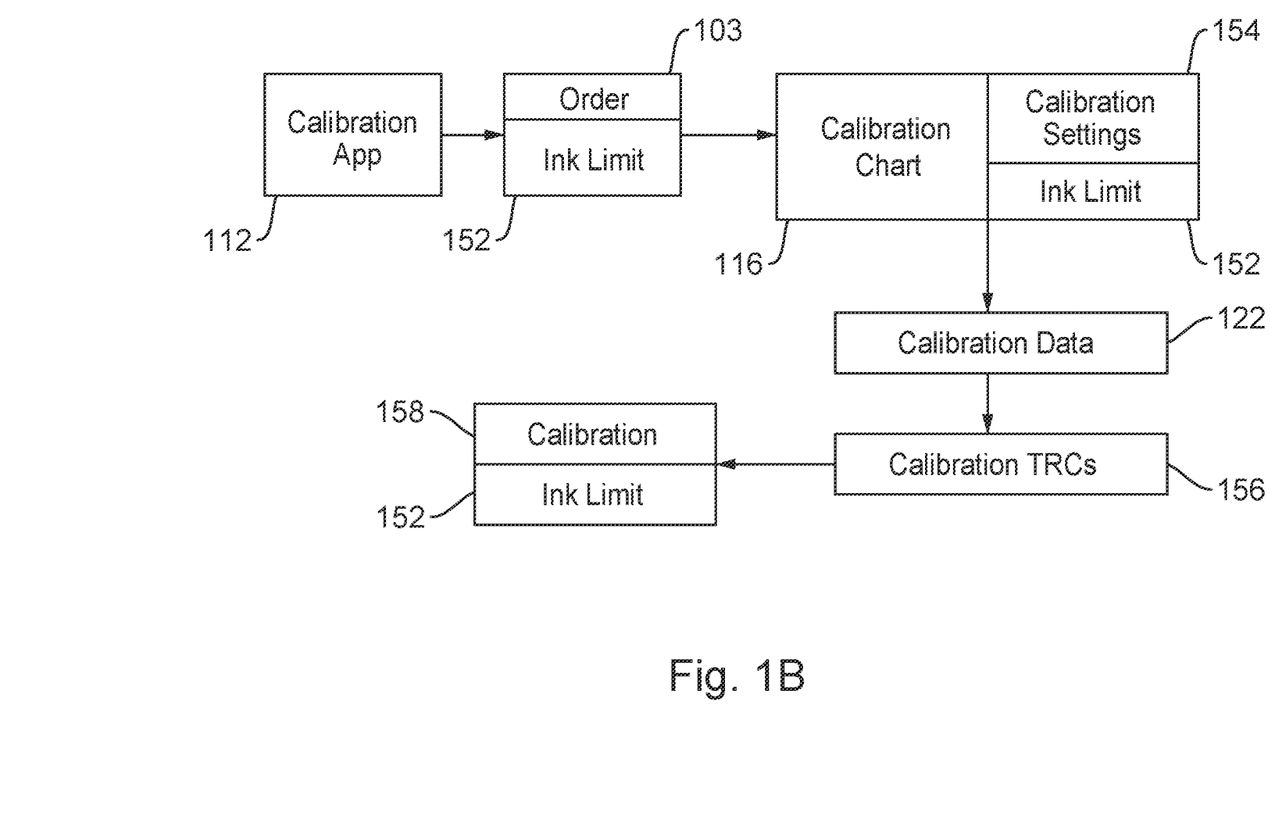
FIG. 1B illustrates a block diagram of the process flow for a calibration process within the color management system according to the disclosed embodiments.

The disclosed embodiments may execute features of system 100 with color management service 102. FIG. 1B depicts a block diagram of the process flow of data for a calibration process according to the disclosed embodiments. Calibration application 112 includes features that allow the operator to specify an ink limit 152 when calibrating a print device. It should be noted although computing device 102, calibration application 112, and color management service 106 are shown as separate components within system 100, these components may be incorporated into a single entity within the system. For example, calibration application 112 may be executed at color management service 106. Computing device 102 may include color management service 106. These features are disclosed separately for illustrative purposes.

Calibration application 122 may prepare order 103 with ink limit 152 along with calibration settings 154. Calibration chart 116 is generated accordingly and sent to the printing device for calibration operations. Ink limit 152 and calibration settings 154 associated with calibration chart 116 are stored, preferably at color management service 106.

The operator or printing device measures calibration chart 116 after it is printed out at the printing device. Calibration data 122 is captured by measuring the color patches and the printed colors associated therewith. The data is provided back to color management service 106 for analysis. Using the measured data, order management service 106 generates calibration tone reproduction curves (TRCs) using calibration settings 154. Calibration settings 154 include end point targets and aims for the colors. Once calibration TRCs 156 are created, they are downloaded to the printing device. Alternatively, if calibration is implemented at the printing device, then calibration application 112 will stored calibration TRCs 156 in digital front end (DFE) 132. Calibration application 112 also will store ink limit 152 and store them with the calibration information.

Figure 1C:
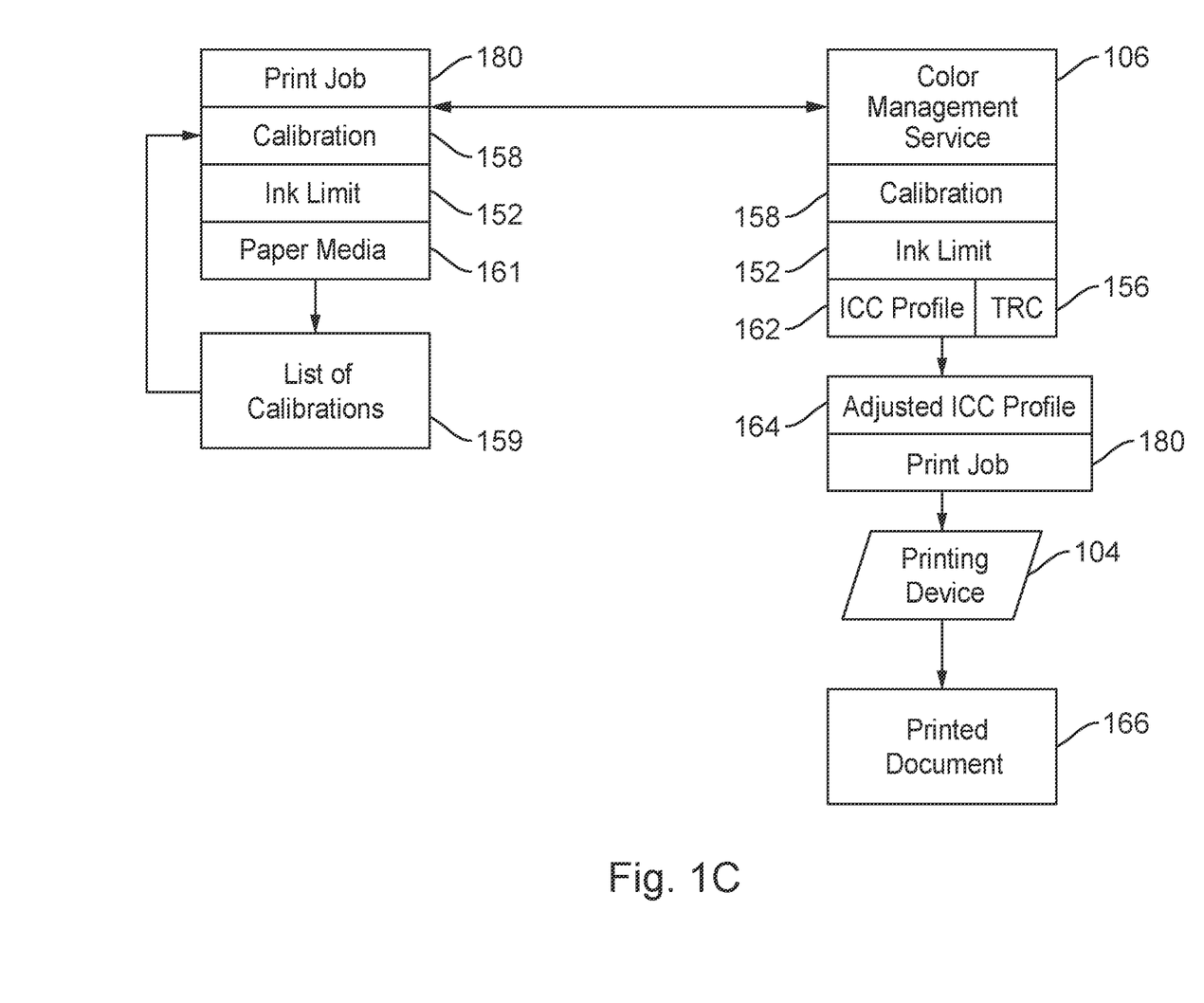
FIG. 1C illustrates a printing process in the color management system using the ink limits according to the disclosed embodiments.

FIG. 1C depicts a printing process in system 100 using ink limits 152 according to the disclosed embodiments. FIG. 1C shows printing device 104 but the disclosed processes may be applicable for all printing devices within system 100. Further, although FIG. 1C shows print job 180 is submitted to color management service 106, it may be submitted directly to printing device 104.

Color printing of print job 180 is requested. With print job 180, calibration 158 is identified that should be used. The identification may occur by specifying calibration 158 from a list of calibrations 159. As can be appreciated, a plurality of calibrations may apply to color printing on printing device 104. As noted above, calibration charts may be used to generate calibrations for different types of print jobs requiring color printing. Calibration 158 may be selected in other way. For example, calibration 158 may identified indirectly by specifying paper selection with print job 180. Thus, paper media 161 is specified and calibration 158 associated with the paper media is selected. List of calibrations 159 may be queried according to paper media 161 to identify calibration 158. Alternatively, nothing may be specified with print job 180 so that a default calibration is used.

Color management service 106 receives print job 180. In some embodiments, color management service 106 may identify calibration 158, as disclosed above. In other embodiments, color management service 106 uses the identified calibration with the print job to perform further operations. With calibration 158, color management service 106 retrieves ink limit 152 specified earlier with the calibration operations.

Color management service 106 also retrieves ICC profile 162 for print job 180. It also may identify a TRC 156, if needed. ICC profile 162 may be referenced in the print instruction for print job 180 or downloaded by the controller at printing device 104. ICC profile 162 may be embedded in print job 180. ICC profile 162 may already be in the controller of printing device 104. ICC profile 162 may be a default ICC profile in the controller.

ICC profile 162 may be used to define the color of image data in a way to make it possible to exchange images between systems, while retaining any color requirements imposed in the image. Part of these requirements may be ink limits. ICC profile 162 is used to enable color reproduction at printing device 104 for the specified colors applicable to print job 180. ICC profile 162 may provide a number of color transformations that define the color expected from the encoded data of the digital image of print job 180, in an open format. The transformations may be accomplished using look-up tables, matrices, parametric curves, and the like. ICC profile 162 includes multiple transformations. An objective of ICC profile 162 is to ensure that colors from the input of print job 180 will match those on the output, or printed document 166 shown in FIG. 1C, assuming the output has an adequate color gamut.

Once ICC profile 162 is selected, color management service 106 will specify or read ink limit 152, or ink limit value, to automatically adjust ICC profile 162. Thus, ink limit 152 specified above and stored with calibration TRC 156 and calibration data 122 is applied to generate adjusted ICC profile 164. Adjusted ICC profile 164 may be provided with print job 180 to printing device 104. Printing device 104 may perform color conversion using adjusted ICC profile 164 using normal color conversion processes in order to print printed document 166 that includes the color images and data corresponding to those in print job 180.

Ink limit 152 may relate to the total ink limit (TIL) for color printing. TIL may relate to paper media 161 or printing device limitations. TIL also may be known as total area coverage (TAC). Ink limit, or TIL, 152 prevents over-inking and optimizes the dynamic range of printing device 104. Ink limit 152 may relate to the maximum possible percentage of ink that may be used for color printing. In other words, the ink limit stems from the fact that only so much ink can be used in a media. The interaction between ink and media will impact the color. Too much ink may cause run offs or other problems. Ink limit 152 may be enforced within adjusted ICC profile 164 such that certain patches within the gamut over the ink limit will be adjusted according when producing printed document 166. Adjusted ICC profile 164 adheres to ink limit 152.

Calibration TRC 156 also may be identified and used to perform TRC adjustments to the converted color output from adjusted ICC profile 164. Calibration TRC 156 may be used to achieve certain effects on a consistent basis. The disclosed processes enable printing system 100 to access ink limiting functionality without having to create ICC profiles. Ink limit 152 is applied without creation of an ICC profile. System 100 or color management service 106 does not need to know anything about ICC profiles in establishing ink limit 152.

According to the disclosed embodiments, color conversion may be performed in two different ways. One way may be a two-step conversion with any source of print job 180 going through the profile connection space (PCS) of the ICC profiles to the destination, such as printing device 104. In this case, ink limit 152 is applied to the destination ICC profile. Another way may be one-step conversion from a specific source to a specific destination. In this case, ink limit 152 is applied to the device link ICC profile.

The controller of printing device 104 also may cache adjusted ICC profiles in order to improve performance. When the controller creates an ink limited ICC profile, it retains both original ICC profile 162 and adjusted ICC profile 164. The controller will retain an adjusted ICC profile for every ink limit that is defined by customers or order management service 106. When a new print job is received, the controller will determine the ICC profile that should be used and the ink limit. If the controller has cached an ink limited ICC profile, then it will use the saved profile, thereby eliminating the need to adjust the original ICC profile.

In some embodiments, ink limit 152 may be received with print job 180. Thus, it is not stored with calibration TRC 156. This feature may be applicable in instances that print job 180 also includes original ICC profile 162. The same processes may be used to generate adjusted ICC profile 164 using ink limit 152 but without the need for calibration. The disclosed embodiments also may include instances where adjusted ICC profile 164 is generated as part of the calibration operations along with calibration TRC 156. Ink limit 152 is specified and applied accordingly. Adjusted ICC profile 164 may be stored with calibration TRC 156.

Ink limit 152 also may be adjusted during printing operations. It may be increased or decreased according to operator instruction or by system 100. If so, then the disclosed processes on generating adjusted ICC profile 164 may be repeated so that the new ink limit is applied to color printing operations. Thus, ink limits are adjusted after the fact. The disclosed embodiments can dynamically apply ink limits in color printing without having the recreate ICC profiles each time an ink limit is changed.

Figure 2:
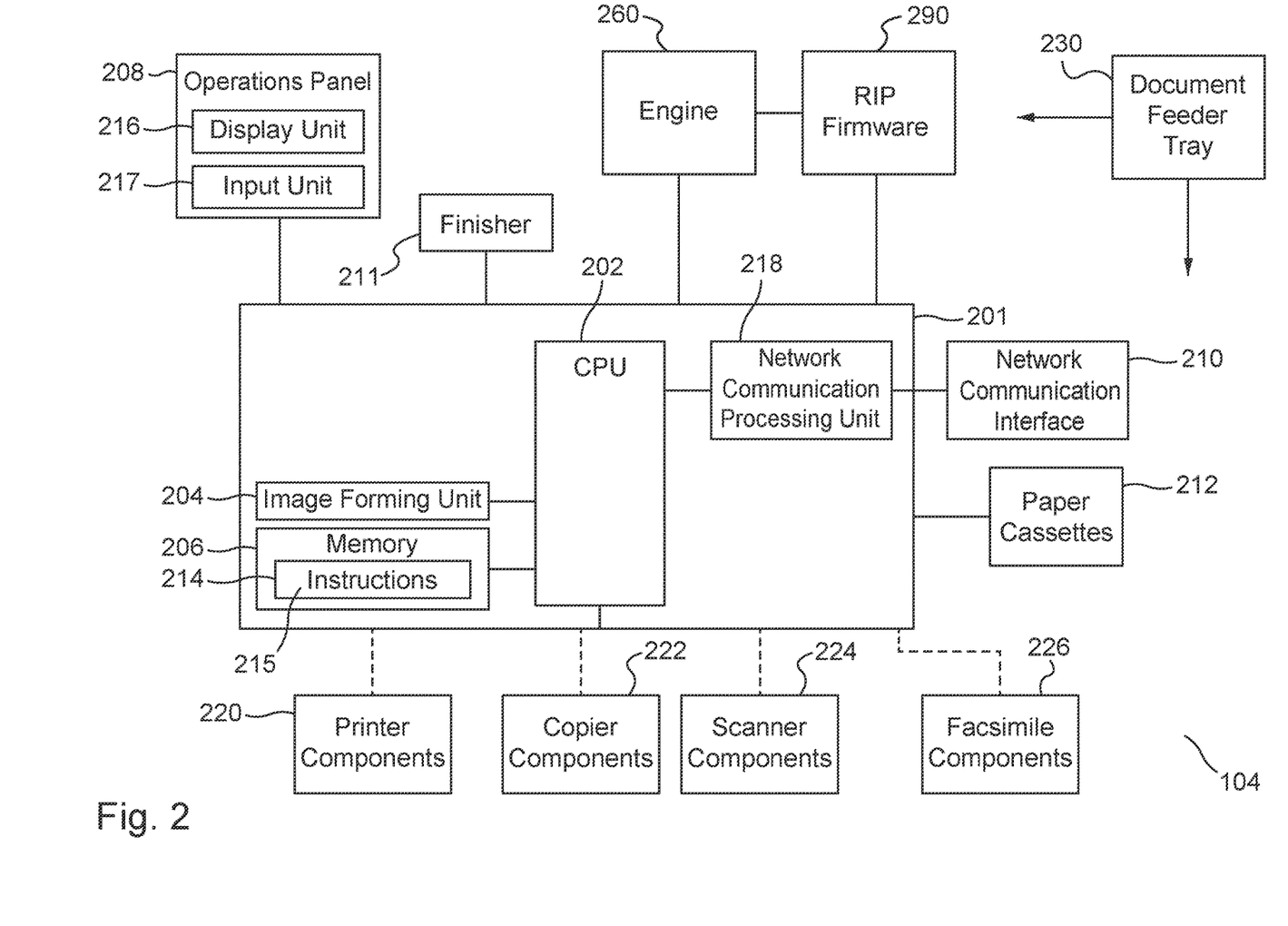
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from color management service 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or network service 106. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with network service 106 via network communication interface 210 by utilizing a network protocol, such as the ones listed above. In some embodiments, printing device 104 communicates with network service 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from color management service 106.

Figure 3:
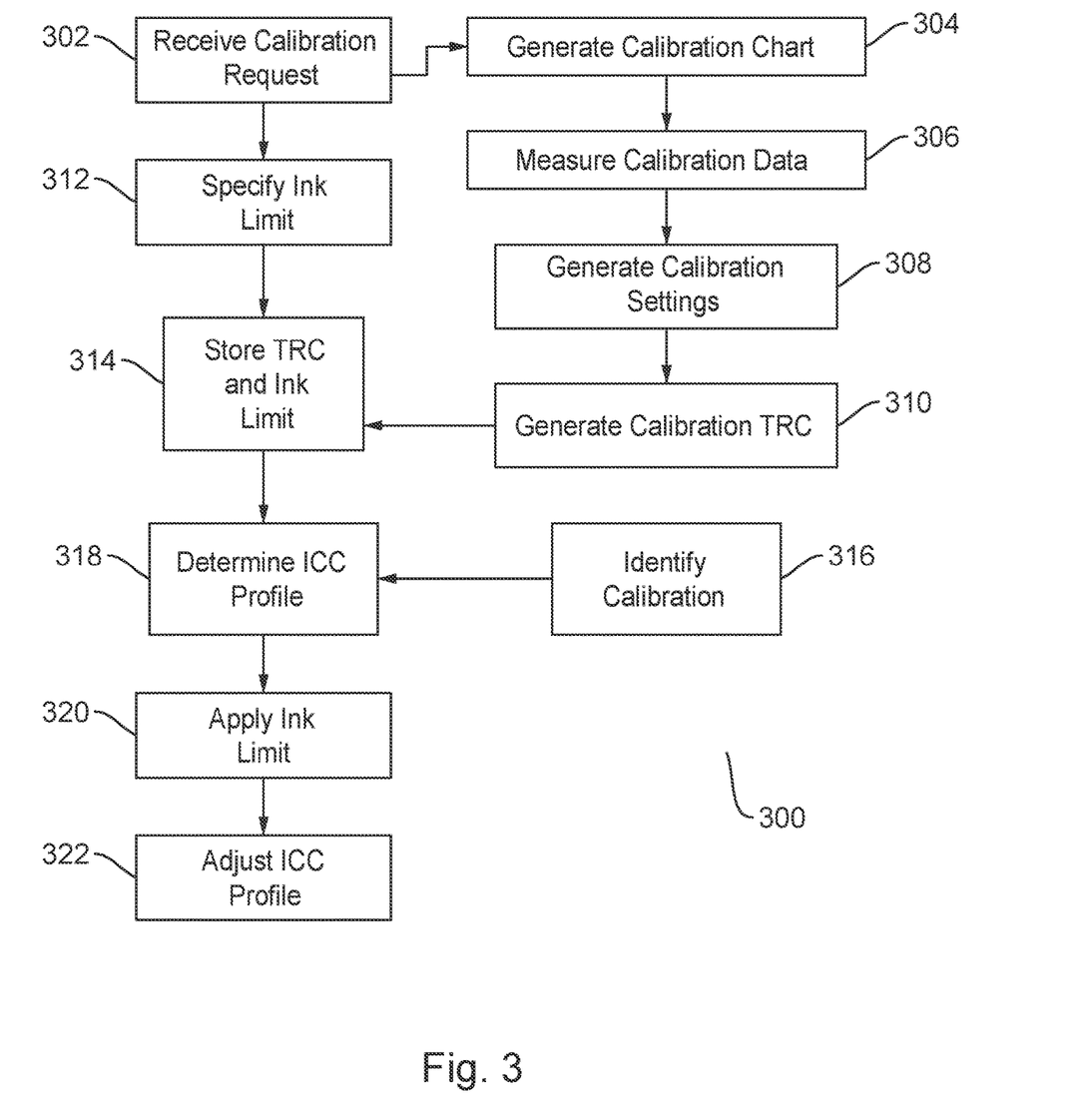
FIG. 3 illustrates a flowchart for performing color management of a printing device according to the disclosed embodiments.

FIG. 3 depicts a flowchart 300 for performing color management of printing device 104 according to the disclosed embodiments. Flowchart 300 may refer to elements of FIGS. 1A-2 for illustrative purposes. Flowchart 300, however, is not limited to the embodiments disclosed by FIGS. 1A-2.

Step 302 executes by receiving a calibration request at color management service 106. In some embodiments, application 112 may send order 103 to color management service 106 to perform a calibration operation on a printing device within system 100. For example, the calibration request may be one for printing device 104. The calibration operation may be performed on all printing devices within system 100. In alternate embodiments, the calibration request may be received directly at printing device 104.

Step 304 executes by generating calibration chart 116, as disclosed above. Calibration chart 116 is sent to printing device 104. It also may be sent to other printing devices within system 100. In some embodiments, color management service 106 generates calibration chart 116. Alternatively, printing device 104 may do so or may retrieve a stored calibration chart to use. Printing device 104 prints calibration chart 116. Step 306 executes by measuring calibration data 122 using the color patches of calibration chart 116. Color measurement tool 108 may be used to capture calibration data 122. Calibration data 122 may be provided to color management service 106 for processing and analysis.

Step 310 executes by generation one or more calibration TRCs 156 using calibration settings 154, such as end point targets and aims. Calibration settings 154 may be generated in a previous step and stored with calibration chart 116. Alternatively, calibration settings 154 may be modified based on calibration data 122.

Step 312 executes by specifying ink limit 152 for the calibration operation. Ink limit may be specified in order 103 from application 112. Ink limit 152 may be a value such as 250% which denotes a predefined value of the maximum possible percentage of ink that may be used to reproduce colors, as disclosed above. Step 314 executes by storing calibration TRC 156 and ink limit 152. Ink limit 152 also may be specified prior to steps 304-310 and stored with calibration chart 116, as well as calibration settings 154, if applicable. In some embodiments, these elements are downloaded to printing device 104. They may be stored in the DFE of printing device 104. Alternatively, these elements may be stored with color management service 106. Calibration 158 is associated with calibration TRC 156, ink limit 152, as well as, if applicable, calibration settings 154, and calibration chart 116.

To generate an ICC profile adjusted for ink limit 152, flowchart 300 executes step 316 by identifying calibration 158. The identification of calibration 158 may occur several ways. For example, identification may be done directly by specifying calibration 158 from a list of calibrations 159. Calibration 158 may be specified by the print job, such as print job 180 received by color management service 106 or printing device 104. Calibration 158 may be a default calibration, which is selected by some criteria or instruction. Calibration 158 also may be selected according to paper media 161 of print job 180.

Step 318 executes by determining ICC profile 162 associated with calibration 158. Calibration 158 also is used to determine applicable calibration TRC 156 and ink limit 152. Ink limit 152 may be retrieved from its storage location within color management service 106 or printing device 104. Printing device 104 may use memory 206 to store data. ICC profile 162 may correspond to one or more calibration TRCs 156 generated from calibration data 122. ICC profile 162 is not generated or created with any regard to ink limit 152.

It should be noted that the disclosed embodiments also include those features that allow ink limit 152 to be changed after creation of ICC profile 162. Ink limit 152 may be increased or decreased accordingly. Thus, when the processes embodied by flowchart 300 are repeated, the new ink limit is applied to ICC profile 162 to implement the increase or decrease. This feature alleviates the need to totally create new ICC profiles based on the changes.

Step 320 executes by applying ink limit 152 to ICC profile 162. Step 322 executes by adjusting ICC profile 162 according to ink limit 152 to generate adjusted ICC profile 164. Adjusted ICC profile 164 is used for printing operations by printing device 104. In this manner, ink limit 152 is specified as part of the calibration process. A new ICC profile does not need to be created when ink limit 152 is specified. Instead, ink limit 152 is used to adjust an existing ICC profile, thereby reducing the work needed to maintain and use ICC profiles.

Figure 4:
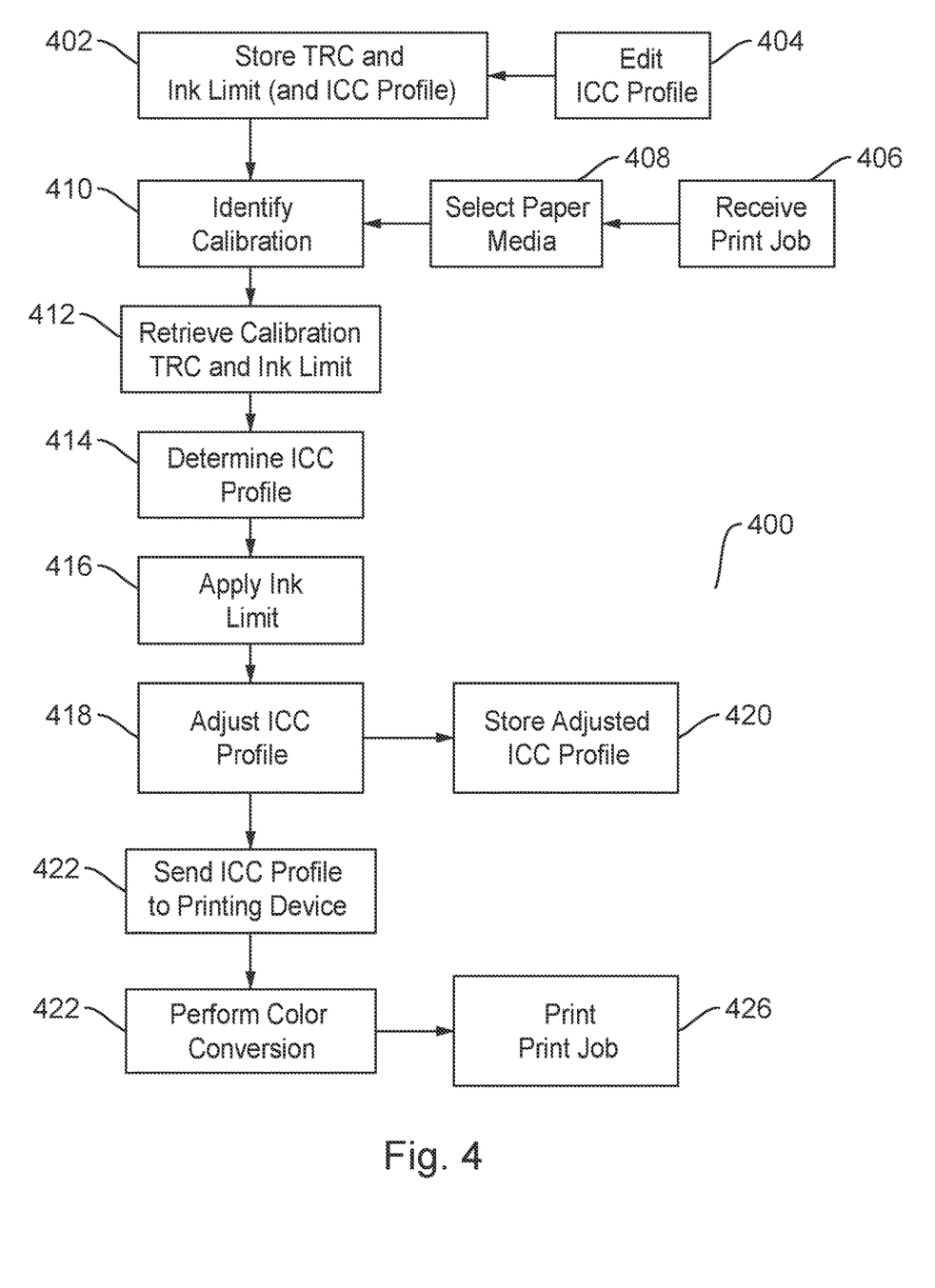
FIG. 4 illustrates a flowchart for managing color printing of a print job according to the disclosed embodiments.

FIG. 4 illustrates a flowchart 400 for managing color printing of a print job according to the disclosed embodiments. Flowchart 400 may refer to elements of FIGS. 1A-3 for illustrative purposes. Flowchart 400, however, is not limited to the embodiments disclosed by FIGS. 1A-3.

Step 402 executes by storing calibration TRC 156 and ink limit 152. Ink limit 152 may be specified before calibration TRC 156 is generated, as disclosed above. More than one calibration TRC 156 may be stored with ink limit 152. Prior or subsequent to step 402, ICC profile 162 may edited or updated. ICC profile 162 may be associated with calibration TRC 156. For example, ICC profile 162 may be updated after a recalibration operation along with any associated TRCs. Ink limit 152 has not been applied to ICC profile 162 so it is not a factor at this time. ICC profile 162, whether or not edited, may be stored with calibration TRC 156 and ink limit 152. These elements may be stored at printing device 104. Alternatively, they may be stored within color management service 106.

Step 406 executes by receiving print job 180 within printing system 100. Computing device 102 may generated print job 180 and send it to color management service 106. Alternatively, print job 180 may be sent to printing device 104. Print job 180 may include certain parameters for processing the document associated therewith. Step 408 executes by selecting paper media 161 to complete print job 180. Preferably, paper media 161 is available on printing device 104.

Step 410 executes by identifying calibration 158 associated with print job 180. Calibration 158 may set forth actions to be taken before printing out the document or documents of print job 180. As disclosed above, calibration 158 may be selected in a number of ways. In this instance, selected paper media 161 is used to determine calibration 158. For example, print job 180 may call for gloss paper. Calibration 158 for printing the gloss paper is identified. Alternatively, calibration 158 may be specified with print job 180.

Step 412 executes by retrieving calibration TRC 156 and ink limit 152 based on calibration 158. In some embodiments, calibration 158 is stored with calibration TRC 157 and ink limit 152, as disclosed above. Step 414 executes by determining ICC profile 162 for print job 180. As disclosed above, ICC profile 162 may be identified according to a variety of ways. It may be referenced in instructions with print job 180 or in the job file. Alternatively, it may be downloaded by the controller. ICC profile 162 may be embedded in print job 180. It also may be a default ICC profile or the one edited in step 404. In any event, an original ICC profile 162 is identified.

Step 416 executes by applying ink limit 153 retrieved above to ICC profile 162. Step 418 executes by adjusting ICC profile according to ink limit 152. ICC profile 162 may be automatically adjusted within system 100 with no additional data analyzed or captured to incorporate the defined ink limit. Adjusted ICC profile 164 is generated. Step 420 executes by storing adjusted ICC profile 164. It may be stored with ICC profile 162 at printing device 104 or color management service 106. If steps 414-420 occur at color management service 106, then step 422 executes by sending adjusted ICC profile 164 to printing device 104.

Step 424 executes by performing color conversion to process print job at printing device 104 using adjusted ICC profile 164. Printing device 104 may use normal color conversion methods according to adjusted ICC profile 164. In some embodiments, TRC 156 may be used to perform adjustments as well to the converted output. Step 426 executes by printing print job 180 with the color conversions and adjustments. Ink limit 152 may be applied during the printing operation. The disclosed embodiments enables users to access ink limit functionality without having to create new ICC profiles or even doing anything related to ICC profiling. Further, ink limits may be updated as needed.

Figure 5:
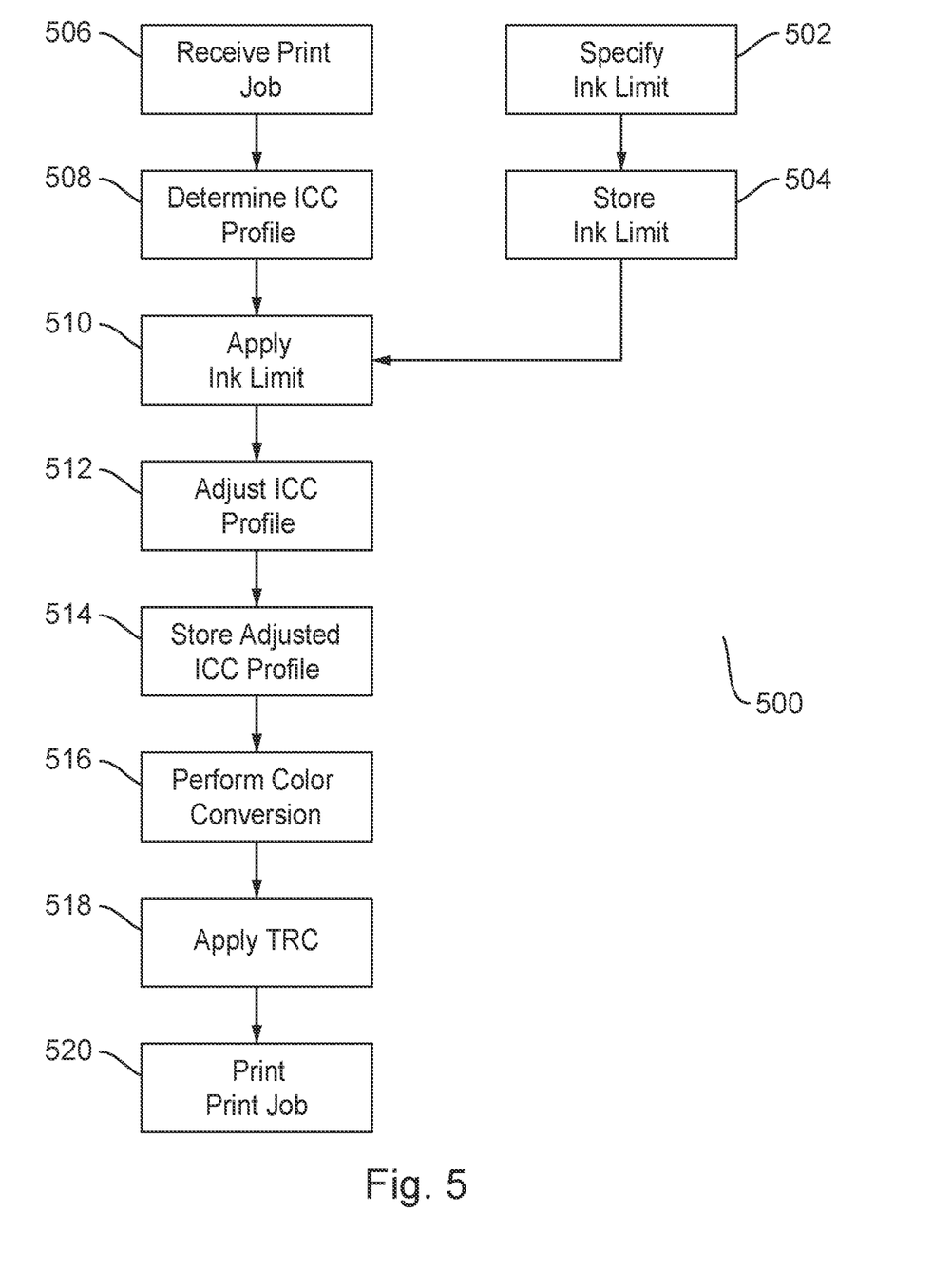
FIG. 5 illustrates a flowchart for color printing a print job at a printing device according to the disclosed embodiments.

FIG. 5 illustrates a flowchart 500 for color printing a print job at a printing device according to the disclosed embodiments. Flowchart 500 may refer to elements of FIGS. 1A-4 for illustrative purposes. Flowchart 500, however, is not limited by FIGS. 1A-4. The embodiments associated with flowchart 500 relate to operations at printing device 104 in applying ink limits.

Step 502 executes by specifying ink limit 152, as disclosed above. Step 504 executes by storing ink limit 152 at printing device 104. Step 506 executes by receiving print job 180 at printing device 104. In some embodiments, ink limit 152 may be specified with print job 180 so that it is not stored at printing device 104. Step 508 executes by determining ICC profile 162 to use for print job 180. ICC profile 162 may be stored or received at printing device 104 for print job 180. As disclosed above, ICC profile 162 may be identified in a number of ways.

Step 510 executes by applying ink limit 152 to ICC profile 162. Step 512 executes by adjusting ICC profile 162 with ink limit 152. Adjusted ICC profile 164 is generated. Adjusted ICC profile 164 is not a new ICC profile in the sense that new or updated data is captured to be generated. Step 514 executes by storing adjusted ICC profile 164. It may be stored at printing device 104. It also may be stored with original ICC profile 162 so that it does not need to be generated for future print jobs.

Step 516 executes by performing color conversion for print job 180 using adjusted ICC profile 164. Step 518 executes by applying TRC 156, if applicable, to perform TRC adjustments to the converted output. Step 520 executes by printing the color document of print job 180.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for performing color management of a printing device, the method comprising:
    measuring a calibration chart for the printing device to obtain measurement data;
    generating a calibration tone reproduction curve (TRC) using calibration settings corresponding to the measurement data;
    specifying an ink limit for the calibration TRC;
    storing the calibration TRC and the ink limit;
    determining an original International Color Consortium (ICC) profile for a print job, wherein the original ICC profile is associated with the calibration TRC;
    adjusting the original ICC profile in accordance with the ink limit to produce an adjusted ICC profiles;
    performing color conversion using the adjusted ICC profile; and
    printing the print job with the color conversion.

2. The method of claim 1, further comprising performing adjustments on a print job at the printing device using the calibration TRC.

3. The method of claim 1, further comprising storing the adjusted ICC profile with the original ICC profile.

4. The method of claim 1, further comprising performing color conversion based on the original ICC profile.

5. The method of claim 1, further comprising identifying a calibration corresponding to the TRC calibration associated with the original ICC profile.

6. The method of claim 5, wherein identifying the calibration includes identifying a paper or media type.

7. A method for managing color printing of a print job, the method comprising:
    storing a calibration tone reproduction curve (TRC) and an ink limit;
    identifying a calibration associated with the print job;
    retrieving the calibration TRC and the ink limit for the print job based on the calibration;

determining an International Color Consortium (ICC) profile for the print job, wherein the ICC profile is associated with the calibration TRC;
adjusting the ICC profile according to the ink limit;
performing color conversion using the adjusted ICC profile; and
printing the print job with the color conversion.

8. The method of claim 7, further comprising editing the ICC profile.

9. The method of claim 8, further comprising storing the ICC profile with the calibration TRC and the ink limit value.

10. The method of claim 9, further comprising generating the calibration TRC using calibration settings.

11. The method of claim 10, further comprising editing the ICC profile according to the ink limit stored with the calibration TRC.

12. The method of claim 7, wherein the identifying the calibration includes identifying the calibration from a plurality of calibrations.

13. The method of claim 7, wherein identifying the calibration includes identifying the calibration based on a paper media for the print job.

14. A method for color printing a print job at a printing device, the method comprising:

receiving the print job at the printing device, wherein the print job includes an ink limit;
identifying a calibration associated with the print job;
retrieving a calibration tone reproduction curve (TRC) for the print job based on the calibration;
determining an original International Color Consortium (ICC) profile for the print job, wherein the ICC profile is associated with the calibration TRC;
adjusting the original ICC profile in accordance with the ink limit to produce an adjusted ICC profile;
performing color conversion for the print job using the adjusted ICC profile; and
printing the print job with the color conversion at the printing device.

15. The method of claim 14, further comprising storing the ink limit with the original ICC profile.

16. The method of claim 14, further comprising specifying the ink limit at the printing device.

17. The method of claim 14, further comprising applying the calibration TRC associated with the calibration and the original ICC profile.

* * * * *